United States Patent
Sun et al.

(10) Patent No.: US 10,834,757 B2
(45) Date of Patent: Nov. 10, 2020

(54) METHODS AND APPARATUS FOR CHANNEL RESERVATION

(71) Applicant: QUALCOMM Incorporated, San Diego, CA (US)

(72) Inventors: Jing Sun, San Diego, CA (US); Taesang Yoo, San Diego, CA (US); Xiaoxia Zhang, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 15/677,692

(22) Filed: Aug. 15, 2017

(65) Prior Publication Data

US 2018/0077725 A1   Mar. 15, 2018

Related U.S. Application Data

(60) Provisional application No. 62/395,144, filed on Sep. 15, 2016.

(51) Int. Cl.
*H04W 74/08* (2009.01)
*H04W 28/20* (2009.01)
(Continued)

(52) U.S. Cl.
CPC ....... *H04W 74/0816* (2013.01); *H04W 28/20* (2013.01); *H04W 28/26* (2013.01);
(Continued)

(58) Field of Classification Search
None
See application file for complete search history.

(56) References Cited

U.S. PATENT DOCUMENTS

| 8,179,873 B2* | 5/2012 | Bonta | H04W 4/20 370/338 |
| 2004/0258092 A1* | 12/2004 | Sugaya | H04L 67/147 370/474 |

(Continued)

OTHER PUBLICATIONS

International Search Report and Written Opinion—PCT/US2017/047196—ISA/EPO—dated Oct. 30, 2017.

*Primary Examiner* — Edan Orgad
*Assistant Examiner* — Emmanuel K Maglo
(74) *Attorney, Agent, or Firm* — Loza & Loza, LLP

(57) ABSTRACT

Aspects of the disclosure relate to reserving resources in wireless communication systems, such as those employing listen before talk (LBT). The disclosed methods and apparatus employ a channel reservation preamble used in a sequence of burst or data packet transmissions. The preamble including a channel reservation indication is included in a first data packet transmitted from a first network node. The channel reservation indication is configured to indicate a transmission time reservation of channel resources covering the data packet containing the preamble, a second data packet to be received from a second network node responsive to the first data packet, and at least a portion of a third data packet transmitted from the first network node subsequent to the transmission of the second data packet. In this manner, over-reservation of channel resources is mitigated. Other aspects, embodiments, and features are also claimed and described.

30 Claims, 12 Drawing Sheets

(51) Int. Cl.
*H04W 28/26* (2009.01)
*H04W 76/11* (2018.01)
*H04L 12/26* (2006.01)
*H04W 24/02* (2009.01)

(52) U.S. Cl.
CPC ......... *H04L 43/0876* (2013.01); *H04W 24/02* (2013.01); *H04W 76/11* (2018.02)

(56) References Cited

U.S. PATENT DOCUMENTS

| | | | |
|---|---|---|---|
| 2006/0153132 A1* | 7/2006 | Saito | H04B 7/155 370/329 |
| 2006/0187964 A1 | 8/2006 | Li et al. | |
| 2007/0153830 A1 | 7/2007 | Xhafa et al. | |
| 2010/0226343 A1* | 9/2010 | Hsu | H04W 74/02 370/336 |
| 2011/0150004 A1* | 6/2011 | Denteneer | H04B 7/0452 370/476 |
| 2012/0207036 A1 | 8/2012 | Ong et al. | |
| 2012/0320856 A1* | 12/2012 | Kim | H04W 28/26 370/329 |
| 2013/0010769 A1* | 1/2013 | Kang | H04W 74/0825 370/336 |
| 2013/0294394 A1* | 11/2013 | Kneckt | H04W 74/0816 370/329 |
| 2014/0056231 A1* | 2/2014 | Magistretti | H04W 74/08 370/329 |
| 2014/0341018 A1* | 11/2014 | Bhushan | H04L 5/0044 370/230 |
| 2015/0016309 A1* | 1/2015 | Fang | H04L 5/14 370/277 |
| 2015/0055541 A1* | 2/2015 | Zhang | H04W 72/005 370/312 |
| 2015/0124723 A1* | 5/2015 | Namba | H04W 74/0816 370/329 |
| 2015/0358826 A1* | 12/2015 | Wei | H04W 72/1268 370/329 |
| 2016/0095110 A1* | 3/2016 | Li | H04W 72/1215 370/329 |
| 2016/0128080 A1 | 5/2016 | Verma et al. | |
| 2016/0150536 A1 | 5/2016 | Valliappan et al. | |
| 2016/0150550 A1* | 5/2016 | Park | H04L 5/0055 370/329 |
| 2016/0164658 A1* | 6/2016 | Fraser | H04W 76/14 370/280 |
| 2016/0174109 A1 | 6/2016 | Yerramalli et al. | |
| 2016/0174262 A1* | 6/2016 | Xing | H04W 74/0825 370/329 |
| 2016/0227571 A1* | 8/2016 | Baek | H04W 16/14 |
| 2016/0227578 A1* | 8/2016 | Lee | H04W 74/004 |
| 2016/0262048 A1 | 9/2016 | Asterjadhi et al. | |
| 2016/0295420 A1 | 10/2016 | Luo et al. | |
| 2016/0353482 A1 | 12/2016 | Valliappan et al. | |
| 2017/0013470 A1* | 1/2017 | Sun | H04W 74/0816 |
| 2017/0127424 A1* | 5/2017 | Kherani | H04L 5/0055 |
| 2017/0202019 A1* | 7/2017 | You | H04W 16/14 |
| 2017/0208475 A1* | 7/2017 | Yi | H04L 27/2602 |
| 2017/0290059 A1* | 10/2017 | Karaki | H04W 74/0816 |
| 2017/0347373 A1* | 11/2017 | Vig | H04W 74/0816 |
| 2017/0347374 A1* | 11/2017 | Mahajan | H04W 84/20 |
| 2018/0063817 A1* | 3/2018 | Chakraborty | H04W 74/0816 |
| 2018/0213567 A1* | 7/2018 | Han | H04B 17/318 |
| 2018/0302868 A1* | 10/2018 | Bhorkar | H04W 74/04 |
| 2019/0090249 A1* | 3/2019 | Han | H04W 72/0446 |

* cited by examiner

METHODS AND APPARATUS FOR CHANNEL RESERVATION

CLAIM OF BENEFIT UNDER 35 U.S.C. § 119

The present Application for Patent claims the benefit of U.S. Provisional Application No. 62/395,144 entitled "METHODS AND APPARATUS FOR CHANNEL RESERVATION" filed Sep. 15, 2016, assigned to the assignee hereof and hereby expressly incorporated by reference herein.

TECHNICAL FIELD

The present disclosure relates generally to wireless communication systems, and more particularly, to channel reservation in wireless communication systems using a channel reservation preamble in burst or data packet transmissions.

INTRODUCTION

In wireless communication systems, a network may include a number of nodes, such as mobile devices or user equipment (UE) and base stations, node Bs, enhanced node Bs (eNBs), gNBs, or other similar devices that support communication for the UEs. UEs may communicate with eNBs, for example, via forward or downlink channels (i.e., the communication link from the eNB to the UE) and reverse or uplink channels (i.e., the communication link from the UE to the eNB).

In particular networks employing certain protocols or procedures, such as Listen Before Talk (LBT) protocols as one example, nodes may reserve a particular time for the transmission of a burst or data packets using particular channels to ensure that other nodes do not interfere through simultaneous transmissions on those channels. A known mechanism for effectuating this reservation is for a network node, such as an eNB, to send a channel usage signal or beacon at the beginning of a burst that alerts other nodes that the node is reserving usage of the particular channels for an entire burst or series of bursts. Such mechanisms, however, may lead to over-protection whereby channel resources are reserved and protected, but may nonetheless go unused.

As the demand for mobile broadband access continues to increase, research and development continue to advance wireless communication technologies not only to meet the growing demand for mobile broadband access, but to advance and enhance the user experience with mobile communications, as well as more efficiently utilize communication network resources such as wireless channels. Of particular note, methods and apparatus for reserving and protecting resources for bursts or data transmissions by a node that avoid over-protection may be beneficial to more efficiently utilize communication network resources.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to transmitting data packets or bursts in particular frames, such as Listen Before Talk (LBT) frames, wherein the preambles include channel reservation signals, such as Channel Usage Beacon Signals (CUBS), that are configured to reserve less resources than other known LBT configurations or other protocols utilizing unlicensed spectrum for example. In one aspect, the channel reservation signals reserve a time covering the time of a current burst or data packet, a next, second burst or data packet, and at least a portion of a third burst after the second burst.

According to an aspect, a method for wireless communication in a wireless communication system is disclosed. The method includes determining a first preamble within a first data packet transmitted from a first network node in the wireless communication system. The first preamble includes a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet; and transmitting the first data packet.

According to another aspect, an apparatus for wireless communication is disclosed. The apparatus includes at least one processor, at least one transceiver communicatively coupled to the at least one processor, and a memory communicatively coupled to the at least one processor. Further, the at least one processor is configured to: transmit a first preamble in a first data packet transmitted from a first network node including a first preamble, the first preamble including a channel reservation signal configured to indicate a transmission time reservation of channel resources covering the first data packet, a second data packet received from a second network node responsive to the first data packet, and at least a portion of a third data packet transmitted from the first network node subsequent to the transmission of the second data packet.

According to yet another aspect, an apparatus for wireless communication is disclosed. The apparatus includes means for determining a first preamble in a first data packet transmitted from a first network node. The first preamble includes a channel reservation signal configured to indicate a transmission time reservation of channel resources covering the first data packet, a second data packet received from a second network node responsive to the first data packet, and at least a portion of a third data packet transmitted from the first network node subsequent to the transmission of the second data packet; and means for transmitting the first data packet.

According to yet another aspect, a non-transitory computer-readable medium storing computer-executable code is disclosed. The code is configured for causing a computer to determine a first preamble within a first data packet transmitted from a first network node in the wireless communication system. The first preamble includes a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet; and transmit the first data packet.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

In order to more efficiently utilize communication network resources, the present disclosure provides methods and apparatus that transmit data packets or bursts in particular frames, such as Listen Before Talk (LBT) frames, where the preambles include channel reservation signals, such as Channel Usage Beacon Signals (CUBS), that are configured to reserve less resources than other known LBT configurations or other protocols utilizing unlicensed spectrum, for example. In a particular aspect, the channel reservation signals reserve a time covering the time of a current burst or data packet, a next, second burst or data packet, and at least a portion of a third burst after the second burst. In another particular aspect, the present disclosure proposes that instead of an eNB sending a CUBS with a Transmit Opportunity (TXOP) that covers an entire sequence of bursts and thus some measure of over-protection, for example, a CUBS NAV field is configured such that it provides more accurate protection for the sequence of bursts; namely a CUBS with a NAV field that covers or reserves the time of the next burst plus a little extra time to cover the next CUBS in the third burst. This reservation allows for better channel resource utilization by minimizing the amount of time reserved for channels for a node, while still ensuring proper operation for systems with LBT and request-to-send (RTS)/clear-to-send (CTS) operation.

Radio Access Network

Figure 1:
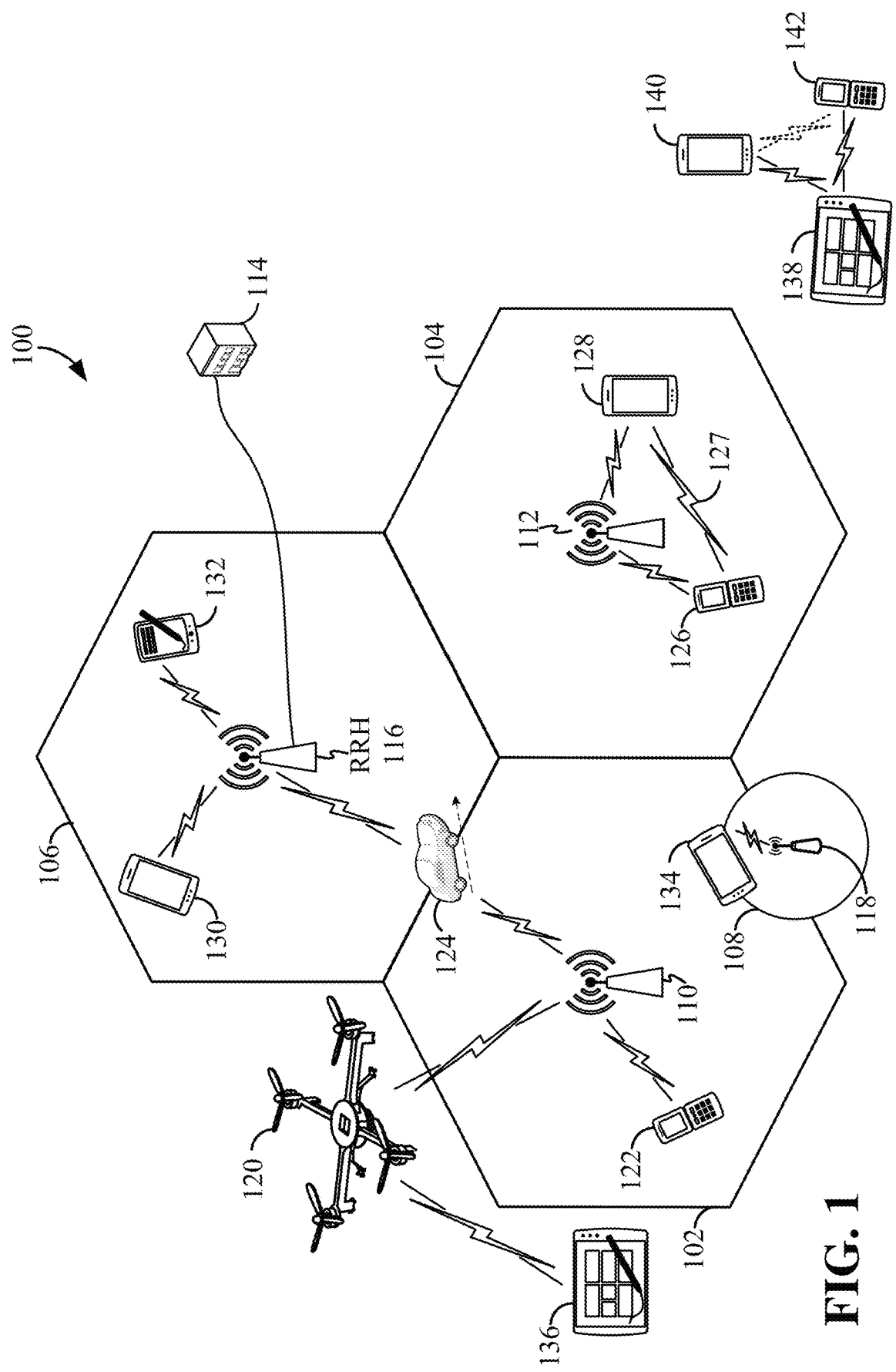
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size.

Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a mobile network node 120, such as a quadcopter or drone, which may be configured to function as a base station. That is, in some examples, a cell may not necessarily be stationary, and the geographic area of the cell may move according to the location of a mobile base station such as the mobile network node 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node 120 (e.g., a quadcopter) may be configured to function as a UE. For example, the mobile network node 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
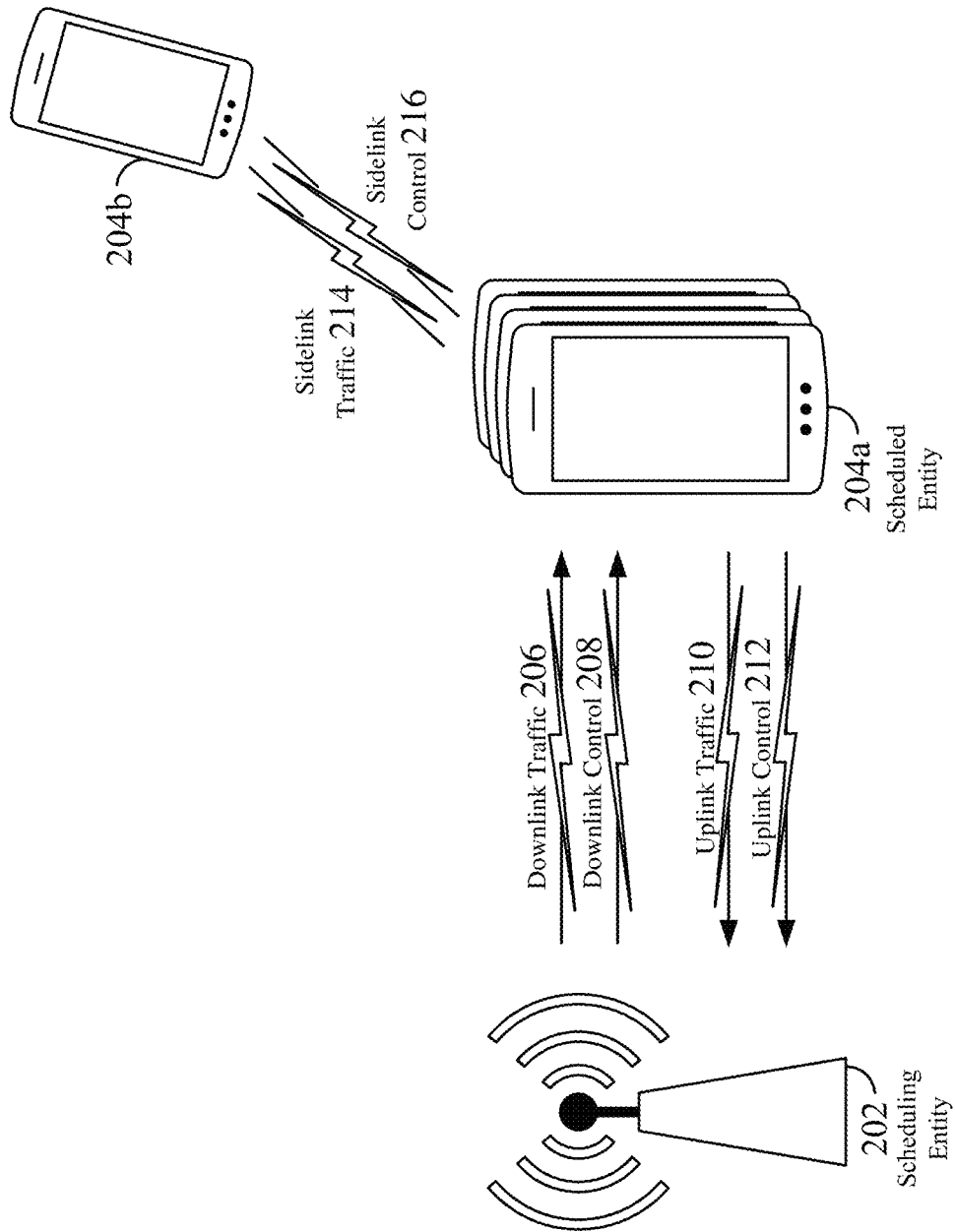
FIG. 2 is a diagram conceptually illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the mobile network node 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214. The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

As discussed before, in certain wireless networks that employ listen before talk (LBT), Request to Send/Clear to Send (RTS/CTS), or similar protocols and mechanisms, a channel reservation signal or beacon may be transmitted at the beginning or preamble of a burst or data packet to reserve channel resources. It is noted here that the use of the term "burst" herein is synonymous with the term "data packet" or "subframe" and these terms connote a structure for organizing a packet or burst of data at a Media Access Control (MAC) layer. Additionally, a number of bursts, subframes, or data packets may be included in a larger frame to be transmitted consisting of multiple bursts, subframes, or data packets. Furthermore, LBT is a contention-based protocol used in wireless communication that allows several wireless devices to utilize the same spectrum or channel.

Channel Reservation

Figure 3:
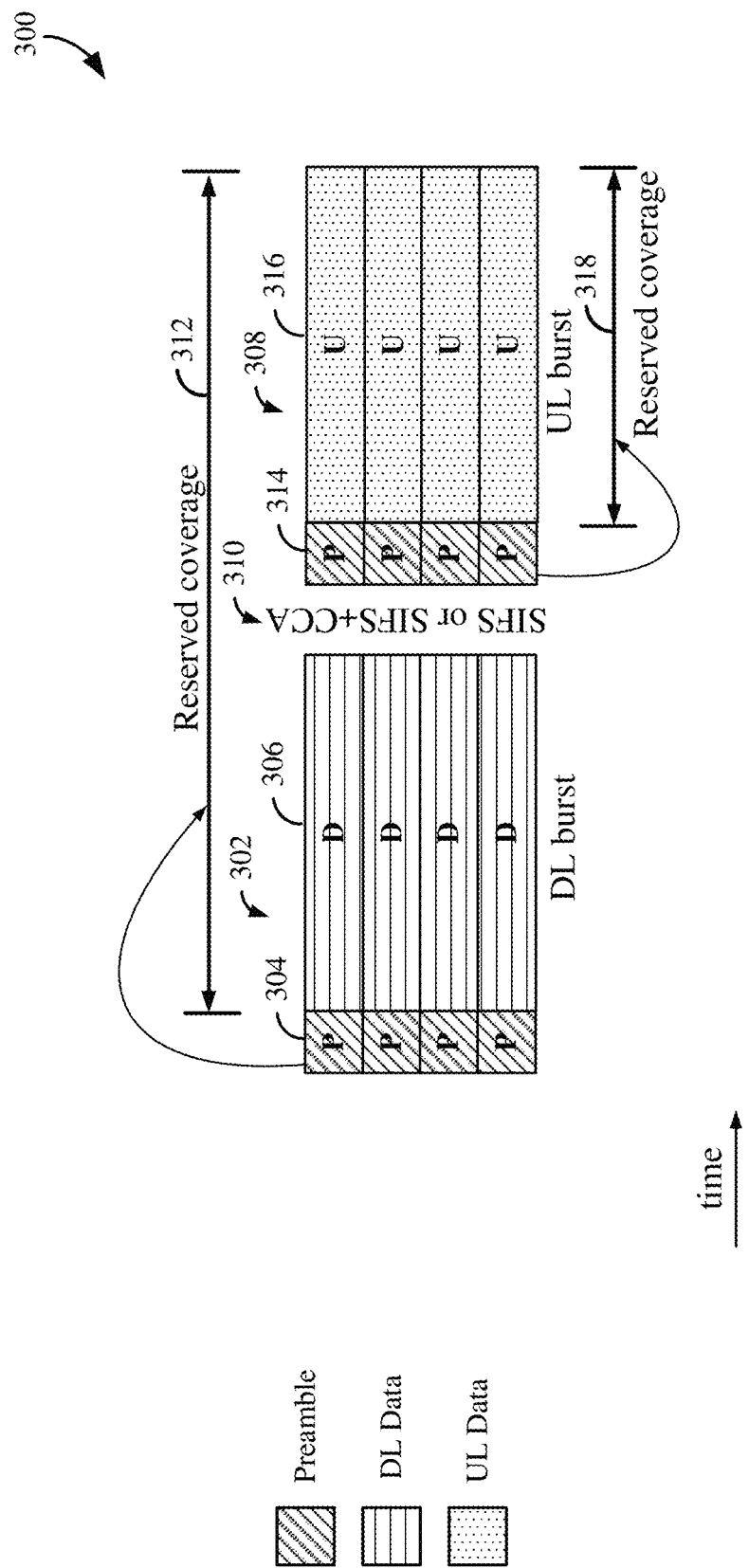
FIG. 3 is a diagram illustrating an example of bursts or packets employing channel reservation preambles.

FIG. 3 illustrates a generalized example of a frame 300 including data packets or bursts in an LBT system without RTS/CTS, for example. A first data packet 302 in the example illustrated is a structure for downlink (DL) data transmission, such as transmission from a node in a network. The node may be an eNB, but is not limited to such and may alternatively be a peer-to-peer node. The data packet 302 includes one or more preambles 304 that include a channel reservation signal, such as a Channel Usage Beacon Signal (CUBS) or some other similarly functioning message or signal that serves to communicate channel reservation or to reserve channel resources. The data packet 302 also includes data transmissions 306 performed by the data packet 302. In an aspect, the data transmissions 306 may be referred to as the payload of the data packet 302. Additionally in the example illustrated, the structure of data packet 302 includes four (4) channels (i.e., each "row" in the data packet structure illustrated constitutes a channel), each of which utilizes a particular subcarrier or bandwidth of available resources. It is noted that the particular number of channels illustrated in this figure and FIGS. 4-9 to follow is not intended to be limiting, and that fewer or greater numbers of channels per data packet are contemplated. Of further note, the illustrated channels according to some examples may each consist of a 20 MHz or 40 MHz channel similar to 802.11 WiFi, but the present application is not limited to such.

A second data packet 308 is used in the uplink (UL) (e.g., transmission from a UE to an eNB and also referred to herein as the UL data packet) and is separated by a set or predetermined time period 310 from the previously transmitted DL data packet 302. The time period 310 may constitute a Short Interface Space (SIFS) as known in 802.11 WiFi, an SIFS with a Clear Channel Assessment (CCA), or any other known settable delay period that allows for accounting for Physical Layer and MAC layer processing delays when switching between DL communication and UL communication, for example. In other aspects, the time separation 310 may be referred to as a gap, a guard period, a guard interval, and/or various other suitable terms.

It is further noted that the channel reservation signal contained in the preamble(s) 304 reserves coverage of the four channels shown over the entire frame (i.e., the DL data packet 302+the UL data packet 308) as indicated by timeline 312. This serves to declare transmission (TX) by the transmitting node for the duration of the DL data packet 302, and also to clear reception in the node for reception of the UL data packet 308.

A preamble 314 in the UL data packet 308 contains a channel reservation signal as well, but reserves channel transmission for only the duration of the transmission of the UL data packet 308 as indicated by timeline 318. The data packet 308 includes data or payload as indicated by reference number 316.

According to an aspect, the preambles 304, 314 may be configured with a WiFi styled preamble when a network employing the preamble coexists with a WiFi network in order to provide cooperation between the networks when sharing unlicensed spectrum, for example. Thus, in such examples the WiFi styled preamble serves as the channel reservation signal or beacon allowing WiFi nodes to back off (or conversely the system nodes to back off) when contending for unlicensed spectrum channels. In another aspect, the preambles 304, 314 may be configured such that the channel reservation signal is a special waveform carrying information such as a network allocation vector (NAV) field that indicates how long other nodes need to back off. According to other aspects, the channel reservation signal may be configured to be compatible with other unlicensed wireless technologies such as Bluetooth, LTE-U, LAA, and/or MuLTEfire, to enable other unlicensed devices to determine the duration of time that an unlicensed channel may be reserved. Notwithstanding, it is also contemplated that the presently disclosed methods and apparatus utilizing particular channel reservation signaling may be employable with other radio technologies utilizing licensed spectrum as well.

According to further aspects, it is noted that in LBT frames that do not utilize RTS/CTS such as in the example of FIG. 3, a channel reservation signal (e.g., a preamble with the illustrated signal) may be placed at the beginning of a data packet or burst in each channel reserved. As mentioned before, the channel reservation signal in the DL burst (e.g., 302) is set to cover the entire LBT frame, and serves to declare the DL transmission so that other nodes can back off, as well as to clear the UL reception in the same set of channels for the UL burst (e.g., 308). An eNB transmitting the DL burst, for example, will attempt to use the same set of channels for UL reception. If some of the channels are not used by a UE in the UL burst, such as in the case where the UE fails CCA, a waste of those channel resources may occur. In an LBT system that employs RTS/CTS, for example, the presently disclosed methods and apparatus may provide for even greater improvement of channel resource utilization through improved accuracy of the channel reservation signal.

Figure 4:
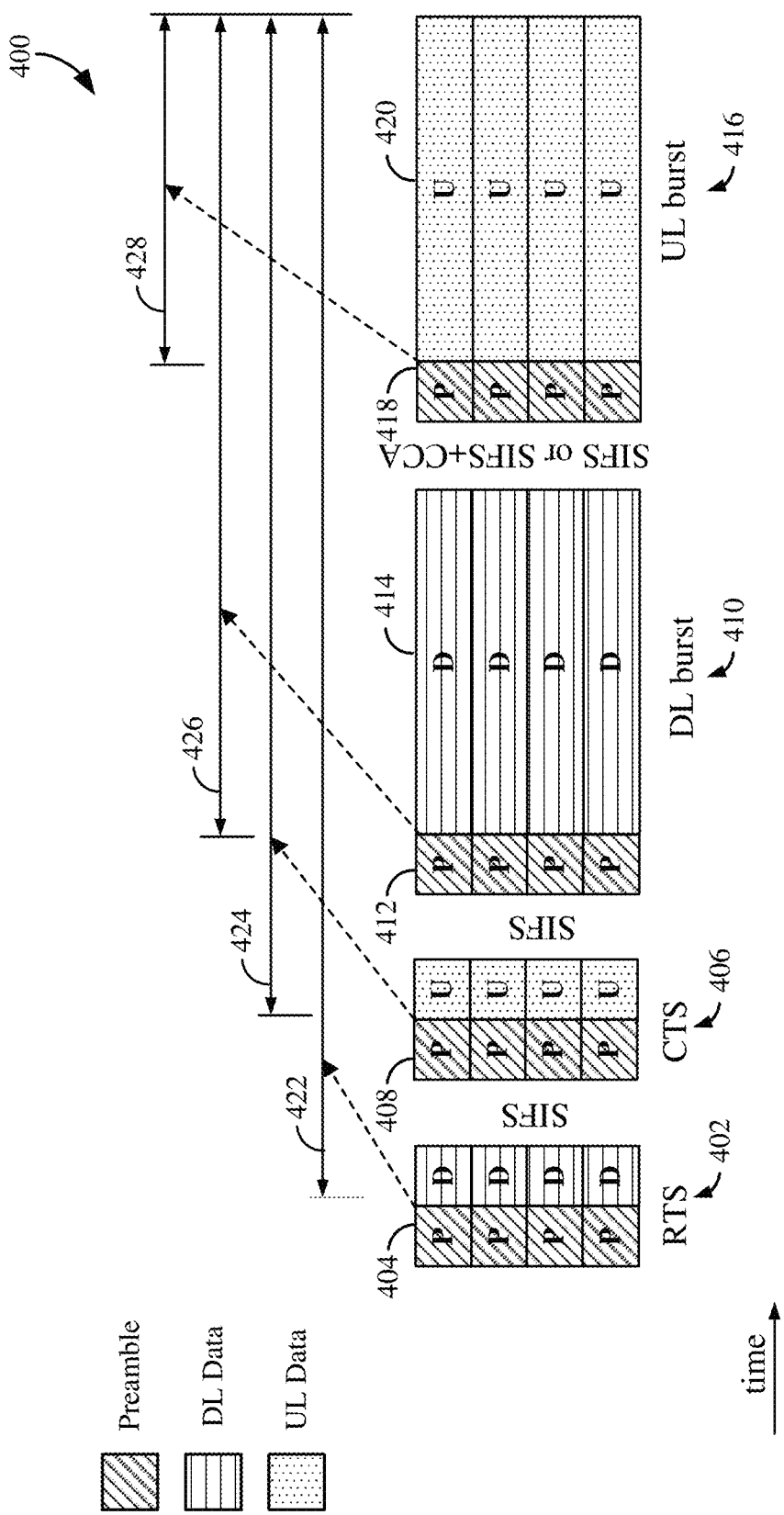
FIG. 4 is a diagram illustrating an example of bursts or packets employing channel reservation preambles in Listen Before Talk (LBT) frames using request to send (RTS) and clear to send (CTS) bursts.

In LBT frames using RTS/CTS, there are typically at least four (4) bursts or data packets that are employed per frame. FIG. 4 illustrates a diagram of an exemplary frame 400 with four bursts or data packets: (1) an RTS burst or data packet 402 containing the DL and UL pre-grants and reservation preambles 404; (2) a CTS burst or data packet 406 containing acknowledgement signaling (e.g., an ACK signal) to the DL/UL pre-grants and reservation preambles 408; (3) a DL burst or data packet 410 containing DL grants, UL grants, reservation preambles 412, and DL traffic or payload 414 (and possibly UL grants only if there is no DL traffic or payload to be transmitted); and (4) a UL burst or data packet 416 containing reservation preambles 418, UL traffic or payload 420, as well as UL control information including access information (and possibly UL control information only if there is no UL traffic or payload to be transmitted).

As may be seen in the example of FIG. 4, there is an SIFS gap between the RTS and CTS bursts 402 and 406. In one aspect, the CTS may be modeled or configured to mirror WiFi behavior, where the CTS would be configured to clear reception (with no data transmission implied). This is similar to the case of an acknowledgement signal (ACK) to a DL pre-grant, but would not cover an ACK to a UL pre-grant. Furthermore, between the CTS 406 and DL bursts 410, the gap is an SIFS gap. Additionally, between the DL burst 410 and the UL burst 416 there is also an SIFS gap. In an aspect, it is contemplated that if the system is modeled to mirror WiFi behavior then a CCA may also be employed during this gap (as well as the other previous gaps in the frame according to some aspects) shown by SIFS+CCA.

FIG. 4 further illustrates that if each preamble employs a channel reservation signal or message in the preambles 404, 408, 412, and 418 according to normal conventions then each of these preambles would contain signaling (e.g., a NAV) that reserves or covers the channels until the end of the LBT frame 400 as shown by timelines 422, 424, 426, and 428. This reservation of the entire frame 400 in each preamble ensures that the channel resources will be available for the LBT frame 400, but it can be appreciated by those skilled in the art that this also presents an issue of over reservation of these resources, particularly if not all or any of the channels are used in the CTS burst 406, DL burst 410, or UL burst 416.

Figure 5:
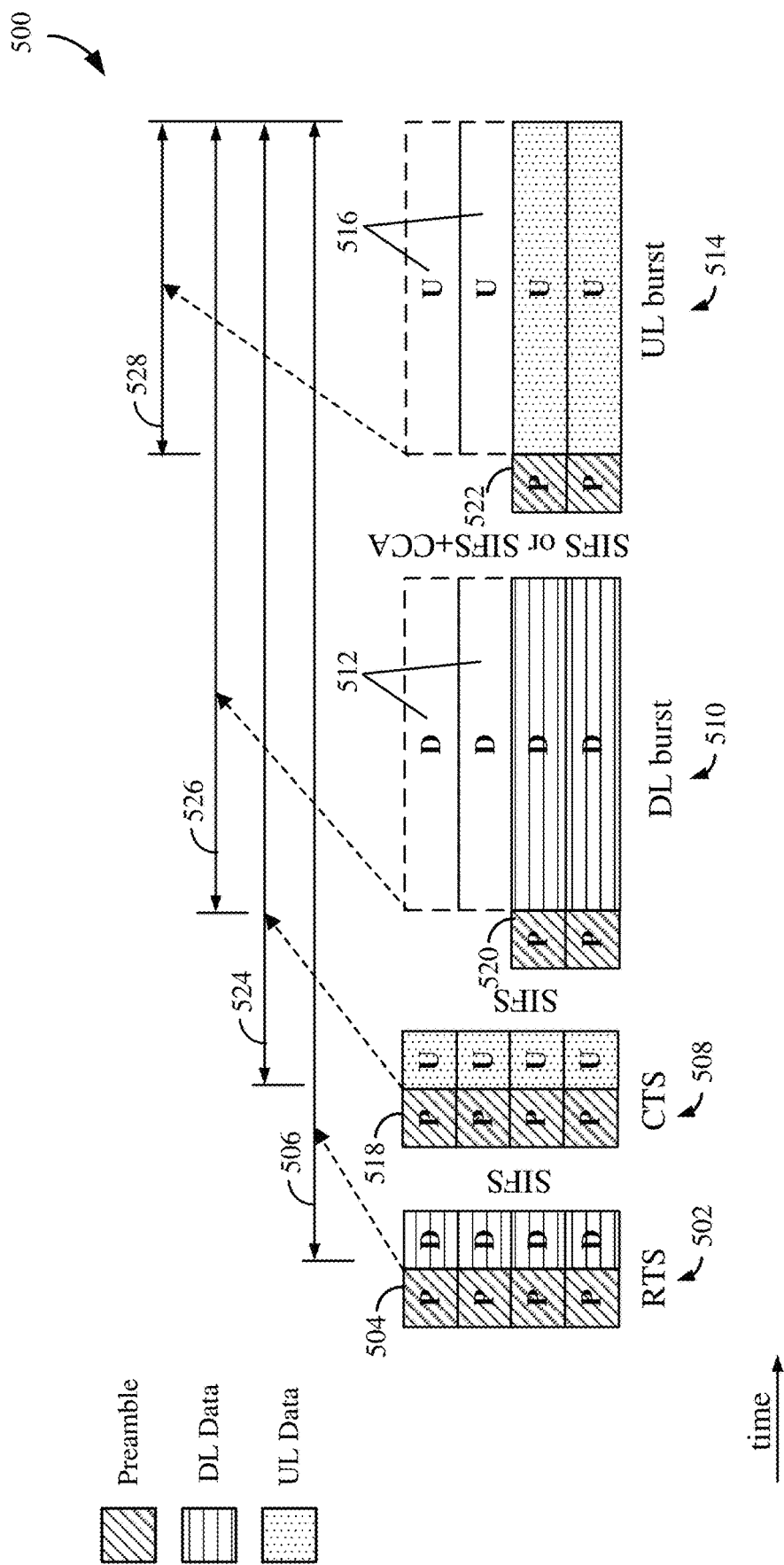
FIG. 5 is a diagram illustrating a scenario in an exemplary system using bursts or frames employing channel reservation preambles in Listen Before Talk (LBT) frames using request to send (RTS) and clear to send (CTS) bursts.

As an illustration of a potential scenario that may arise from the over reservation of resources, FIG. 5 shows an exemplary LBT frame 500 illustrating the effects of over reservation of resources. The frame 500 includes an RTS burst 502 that is first transmitted on all channels from a node such as an eNB, for example. Included in the RTS burst 502 is a preamble 504 with a channel reservation signal (e.g., a NAV) that reserves the channels for the entire frame 500 as indicated by timeline 506. During the subsequent CTS burst 508, another node, such as a UE, may convey information in the CTS burst 508 concerning the nature of the feedback channel, such as a Channel Quality Indicator (CQI) or other known metrics, which then, in turn, may trigger the first node (e.g., the eNB) to select a subset of the available channels for the DL transmission in the subsequent DL burst 510. This scenario is illustrated by transmission of preambles and payload on only two of the four channels in the DL burst 510 in this particular example. Accordingly, since the preamble 504 in RTS burst 502 reserved all channels for the entire LBT frame 500, those channels not used for the DL data burst, as illustrated by reference number 512, will be wasted.

Similarly, over-reservation for UL resources may occur if the transmission of the CTS burst 508 is to acknowledge (ACK) a UL grant, which occurs in time before the CCA is performed after the DL burst 510. Since the first channel reservation signal in preamble 504 reserves the channel for the entire LBT frame 500, and if at the time of a UL data burst 514 the CCA fails for one or more channels (e.g., channels 516 shown in FIG. 5), the UL transmission cannot be performed, and the reserved UL channels will also be wasted.

FIG. 5 further illustrates that if each preamble employs a channel reservation signal or message in the preambles 518, 520, and 522 according to normal conventions then each of these preambles would contain signaling (e.g., a NAV) that reserves or covers the channels until the end of the LBT frame 500 as shown by timelines 524, 526, and 528.

Figure 6:
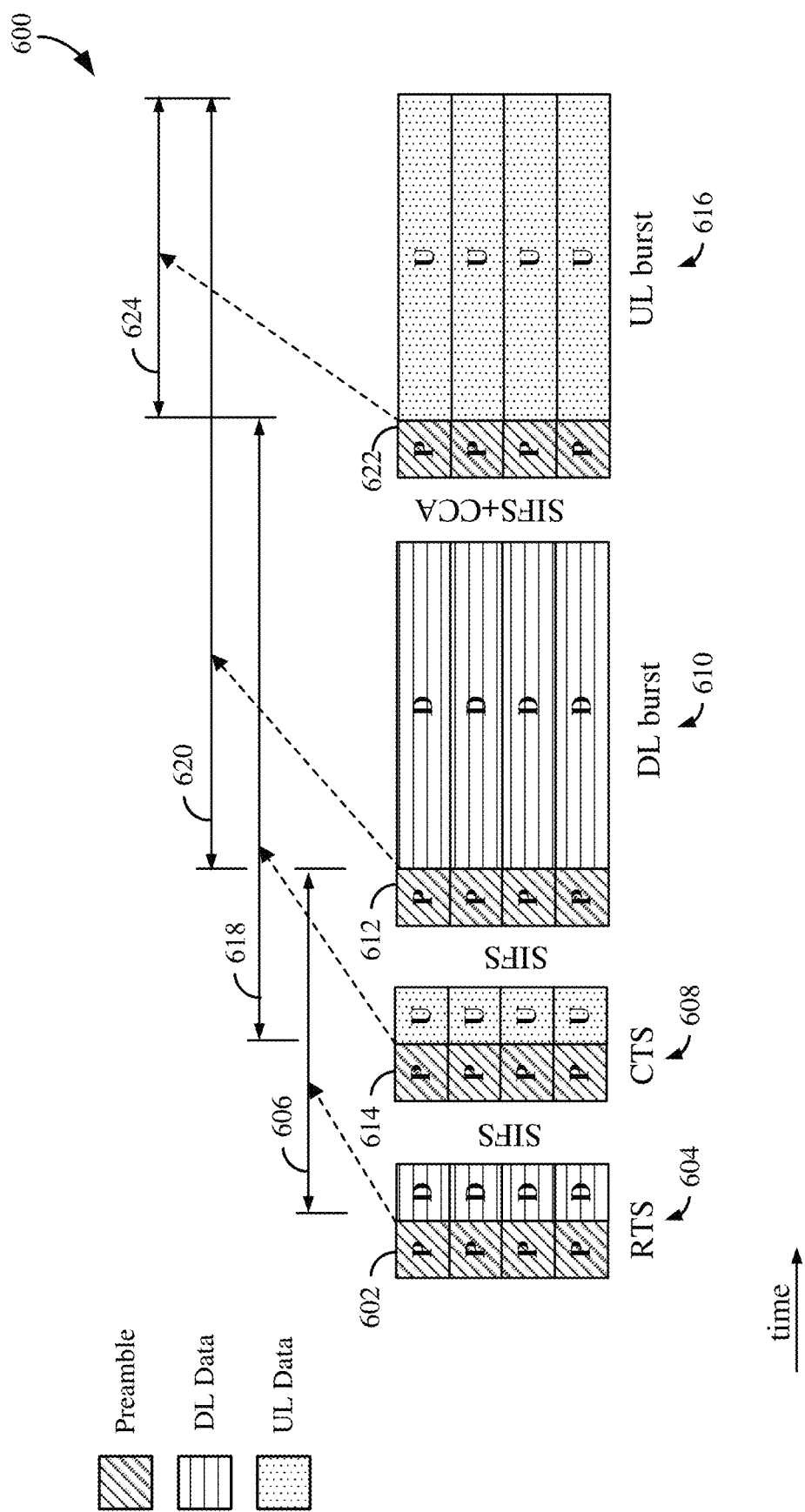
FIG. 6 is a diagram illustrating an example of bursts or frames employing channel reservation preambles configured to reserve a particular time period in a frame according to some aspects of the present disclosure.

In light of the foregoing, FIG. 6 is a diagram illustrating an aspect of the present disclosure wherein the channel reservation signals in the preambles are modified to reserve less time than an entire frame, such as an LBT frame 600. In the example of FIG. 6, channel reservation signal (e.g., a NAV) in the preamble 602 of the RTS burst 604 is configured to cover or reserve a time period 606 covering the next, second burst (i.e., the CTS burst 608) plus further time to cover at least a portion of a next, third burst (i.e., the DL burst 610). In an aspect, the time period 606 is configured to cover at least the preamble 612 of the third burst (i.e., DL burst 610), wherein the channel reservation signal in preamble 602 will be configured to cover the RTS burst 604, the CTS burst 608, and the preamble 612 of the DL burst 610. Accordingly, the channel reservation signal in preamble 602 covers just enough time to reserve the channels for the time period 606, which can then allow for the release of channel resources after that time period should the CTS burst 608, for example, indicate to the first node (e.g., the UE indicating CQI to the eNB with the CTS burst 608) that sufficient channel resources are not available to be allocated for the DL burst 610.

Similarly, the channel reservation signal in a preamble 614 of the CTS burst 608 can be configured to cover the CTS burst 608, the next, second DL burst 610 and at least a portion of the third burst (i.e., third relative to the CTS burst 608), which is the UL burst 616 in this example and the time period is indicated by timeline 618. For the DL burst 610, the channel reservation signal in the preamble 612 of DL burst 610 would be configured to reserve the remaining time (e.g., timeline 620) of the frame 600 since there are only four (4) bursts in the frame 600. Finally, the channel reservation signal in a preamble 622 of the UL burst 616 covers to the end of the frame 600, which is time of the UL burst payload as indicated by timeline 624.

In an aspect, it is noted that the methodology of the example in FIG. 6 includes reserving time for at least the RTS and CTS bursts 604, 608 to cover the preambles of the third burst relative to these bursts (e.g., the preamble 612 of DL burst 610 or the preamble 622 of UL burst 616). This is beneficial according to some examples because if only the second burst was covered, but not at least the preamble of the third burst, a neighbor node that received the channel reservation signal of the first preamble (e.g., preamble 602 or preamble 614) that is nonetheless below the Energy Detection (ED) level may jump in and still try to utilize the channel resources, where the ED level refers to the energy level at which a receiver is able to detect the energy level present on the current channel (frequency range) based on the noise floor, ambient energy, interference sources, and unidentifiable transmissions that may have been corrupted but can no longer be decoded. However, by covering at least the preamble of the third burst (e.g., preamble 612 or preamble 622), this provides the opportunity for the neighbor node to decode the channel reservation signal in the preamble of the third burst as well.

According to other aspects, it is noted that the channel reservation signals according to the example of FIG. 6 will cover the second burst (relative to the first burst from a first node), which will protect the reception of the second burst at the first node. Additionally, the coverage of the beginning of the third packet allows the first node the opportunity to renew the reservation as well. In still other aspects, it is noted that covering of the beginning of the third packet may, in an option, only be needed when the first node expects there will potentially be a third packet transmitted. According to still further aspects, it is contemplated that a transaction may include more than merely the four bursts as shown in the illustrated examples. Accordingly, the presently disclosed methodology may continue reservation signals covering three bursts at a time when a reservation renewal continues past four bursts. It is noted that a reservation renewal may further be effectuated with a channel reservation signal transmission that extends the reservation of channel resources.

Figure 7:
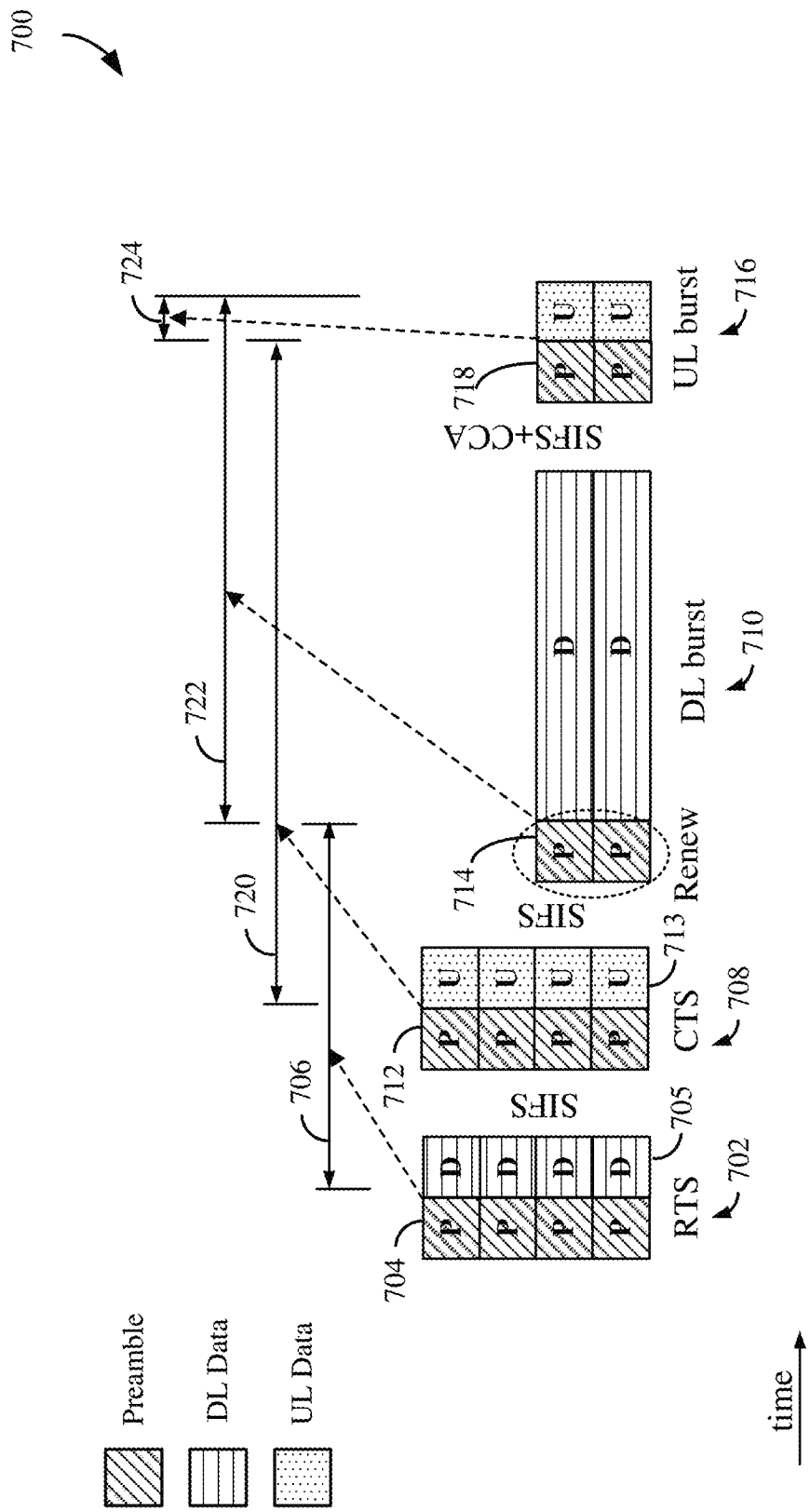
FIG. 7 is a diagram illustrating a scenario of burst transmissions with a downlink pre-grant in an exemplary system configured according to the example of FIG. 6.

FIG. 7 is a diagram illustrating an example of the methodology disclosed in FIG. 6 applied to a scenario having an RTS burst carrying a DL pre-grant of resources. As may be seen in the example of FIG. 7, an LBT frame 700 includes an RTS burst 702 transmitted by a first node (e.g., an eNB) that contains or uses all four available channels and carries a DL pre-grant, which may be in the downlink payload D 705 in one example. The preamble 704 includes a channel reservation signal covering a time period 706 encompassing the time of a CTS burst 708, as well as a portion of a next, third DL burst 710; namely at least the preamble 714 of DL burst 710.

The CTS burst 708, which may be sent by a second node (e.g., a UE) sends an acknowledgement or similar signaling to convey, in response to the received DL pre-grant in RTS burst 702, that a number of the available channels are suitable for transmission of the DL burst 710. In this example, it is assumed that the number of acceptable channels is two (2). In an aspect, the second node (e.g., the UE) may transmit its preamble 712 with channel reservation signals (as well as other information in the uplink payload U 713) only on the channels determined to be acceptable (e.g., the two acceptable channels in this example). Thus, in an aspect, from this transmission only on the acceptable channels by the second node, the first node may determine or deduce therefrom which channels are acceptable for transmission of the DL burst 710.

According to a further aspect, the first node (e.g., the eNB) transmits a preamble 714 in the DL burst 710 including channel reservation signals that act to "renew" or extend the reservation for the acceptable channels and also continues with only data or payload transmission on the acceptable channels as illustrated in FIG. 7 in the DL burst 710 as well as subsequent UL burst 716. Accordingly, the preamble structure according to the present disclosure may afford the further feature of being able to renew a subset of the channel resources, and a resultant "release" of the other channel resources that would naturally occur from not renewing. Thus, these released resources may be utilized by other nodes, thereby providing better resource utilization.

FIG. 7 further illustrates that if each preamble employs a channel reservation signal or message in the preambles 712, 714, and 718 according to normal conventions then each of these preambles would contain signaling (e.g., a NAV) that reserves or covers the channels until the end of the LBT frame 700 as shown by timelines 720, 722, and 724.

Figure 8:
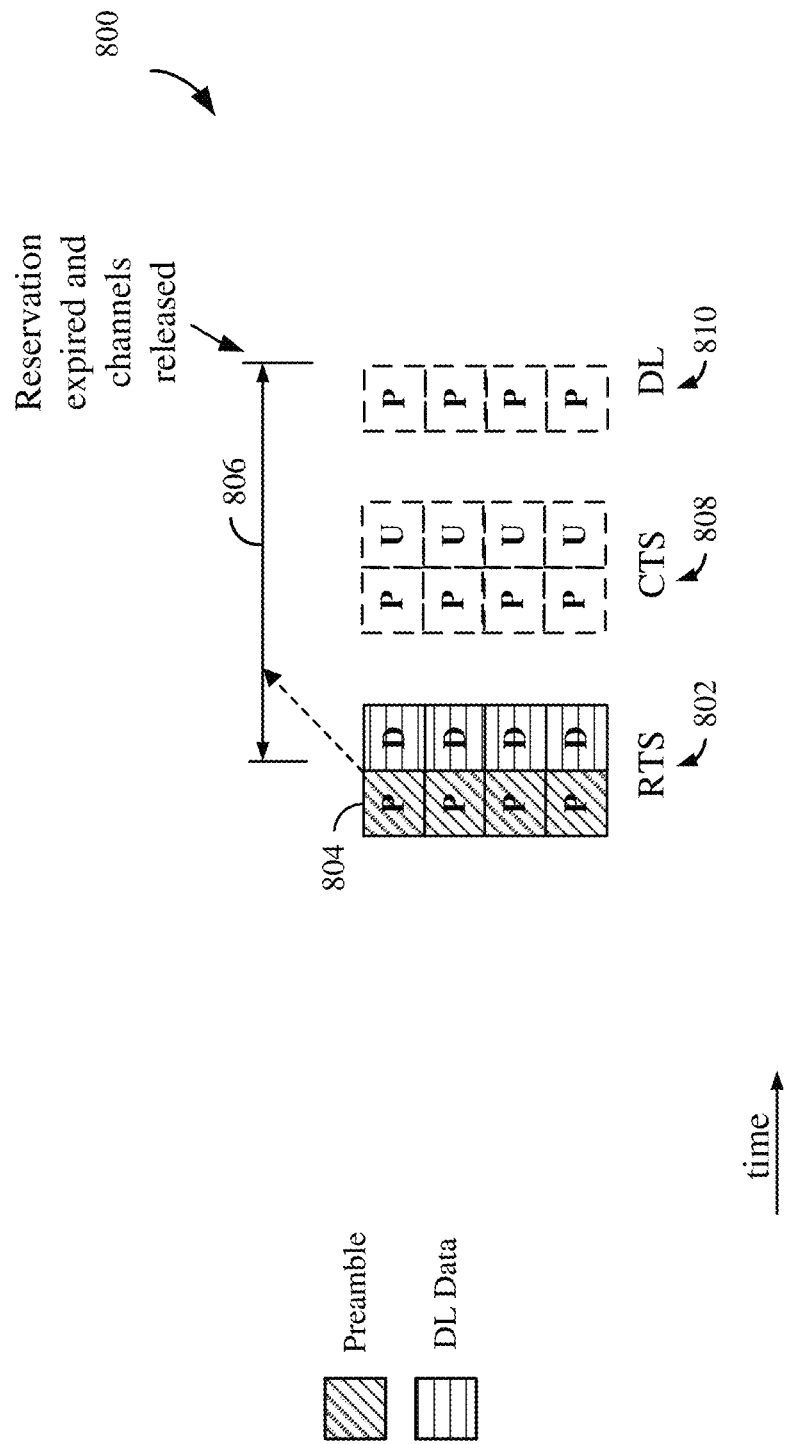
FIG. 8 is a diagram illustrating another scenario of burst transmissions with a downlink pre-grant in an exemplary system configured according to the example of FIG. 6.

FIG. 8 is a diagram illustrating another example of the methodology disclosed in FIG. 6 applied to another scenario having an RTS burst carrying a DL pre-grant of resources. In this example an LBT frame 800 transmitted by a first node (e.g., an eNB) to a second node (e.g., a UE) again includes an RTS burst 802 having a preamble 804 with a channel reservation signal reserving a time period 806 encompassing a time for an expected next second burst (e.g., a CTS burst 808) and a portion of an expected subsequent third burst (e.g., DL burst 810). In this example the second node (e.g., the UE) does not see the grant in the RTS burst 802, such as due to jamming or other interference. In this case, the second node will not provide CTS feedback via a CTS burst, as illustrated by CTS burst 808 being dashed to show the expected time of transmission, but with no transmission occurring. In turn, the first node (e.g., the eNB) will not detect a CTS burst, which is in fact non-existent. Thus, the first node will not send the DL burst 810 and the channel reservation will simply expire at the end of time period 806. In contrast, a scenario, such as that shown in the example of FIG. 4, would see the channel reserved to the end of the LBT frame, thus wasting resources. Accordingly, the methodology of FIG. 6 (or FIG. 7) affords better channel resource utilization.

Figure 9:
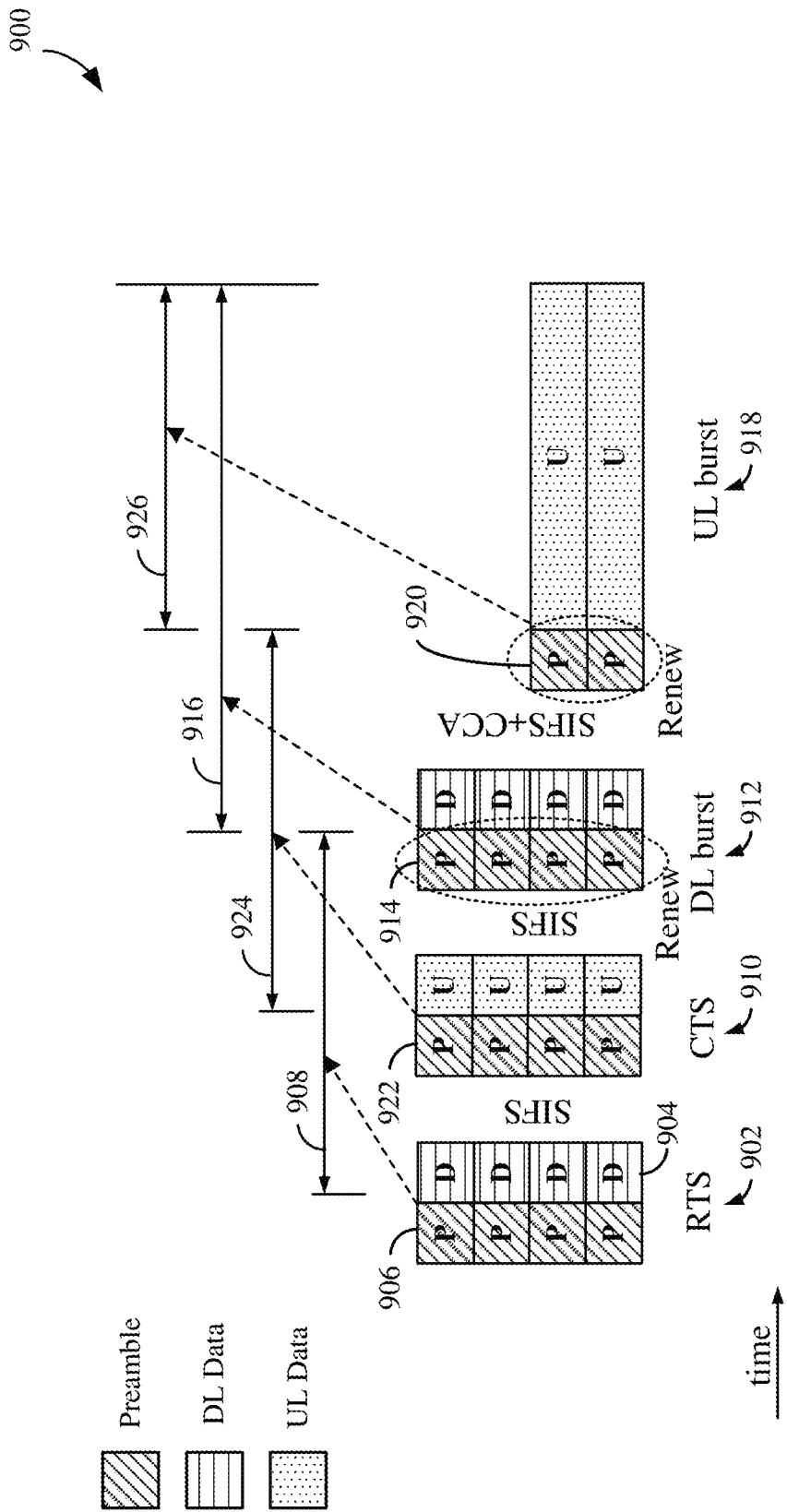
FIG. 9 is a diagram illustrating a scenario of burst transmissions with an uplink pre-grant in an exemplary system configured according to the example of FIG. 6.

FIG. 9 is a diagram illustrating another example of the methodology disclosed in FIG. 6 applied to another scenario having an RTS burst carrying a UL pre-grant of resources. As may be seen in the example of FIG. 9, an LBT frame 900 includes an RTS burst 902 transmitted by a first node (e.g., an eNB) that contains or uses all four available channels and carries a UL pre-grant, which may be in the payload D 904 in one example. The preamble 906 includes a channel reservation signal covering a time period 908 encompassing the time of a CTS burst 910, as well as a portion of a next, third DL burst 912; namely at least the preamble 914 of DL burst 912.

The CTS burst 910, which may be sent by a second node (e.g., a UE) sends an acknowledgement (e.g., a UE ACK) or similar signaling to covey in response to the received UL pre-grant in RTS burst 902. In the subsequent DL burst 912, the first node (e.g., the eNB) transmits a preamble 914 with a channel reservation signal to "renew" the reservation over all channels until the end of the LBT frame 900 (shown with timeline 916).

At the transmission time for a UL burst 918, it is possible that the CCA fails for one or more of the channels. In the example of FIG. 9, two channels are assumed to have failed CCA. Accordingly, the second node (e.g., the UE) will only renew the channel for two remaining channels through the preamble 920 of the UL burst 918. It is noted, however, that for the example of FIG. 9 eNB neighbor nodes, for example, or nodes transmitting DL bursts cannot pick up the released channels as these are channels reserved for UL bursts. Thus, only UE neighbor nodes or other nodes transmitting on the UL will be able to utilize the available channels for UL transmissions. Nonetheless, even in the example of UL pre-grant in FIG. 9, the presently disclosed methodology affords earlier release of resources that may be utilized by at least other UL nodes (e.g., UEs), thereby providing better resource utilization of the communication system.

FIG. 9 further illustrates that if each preamble employs a channel reservation signal or message in the preambles 922 and 920 according to normal conventions then each of these preambles would contain signaling (e.g., a NAV) that reserves or covers the channels until the end of the LBT frame 900 as shown by timelines 924 and 926.

Figure 11:
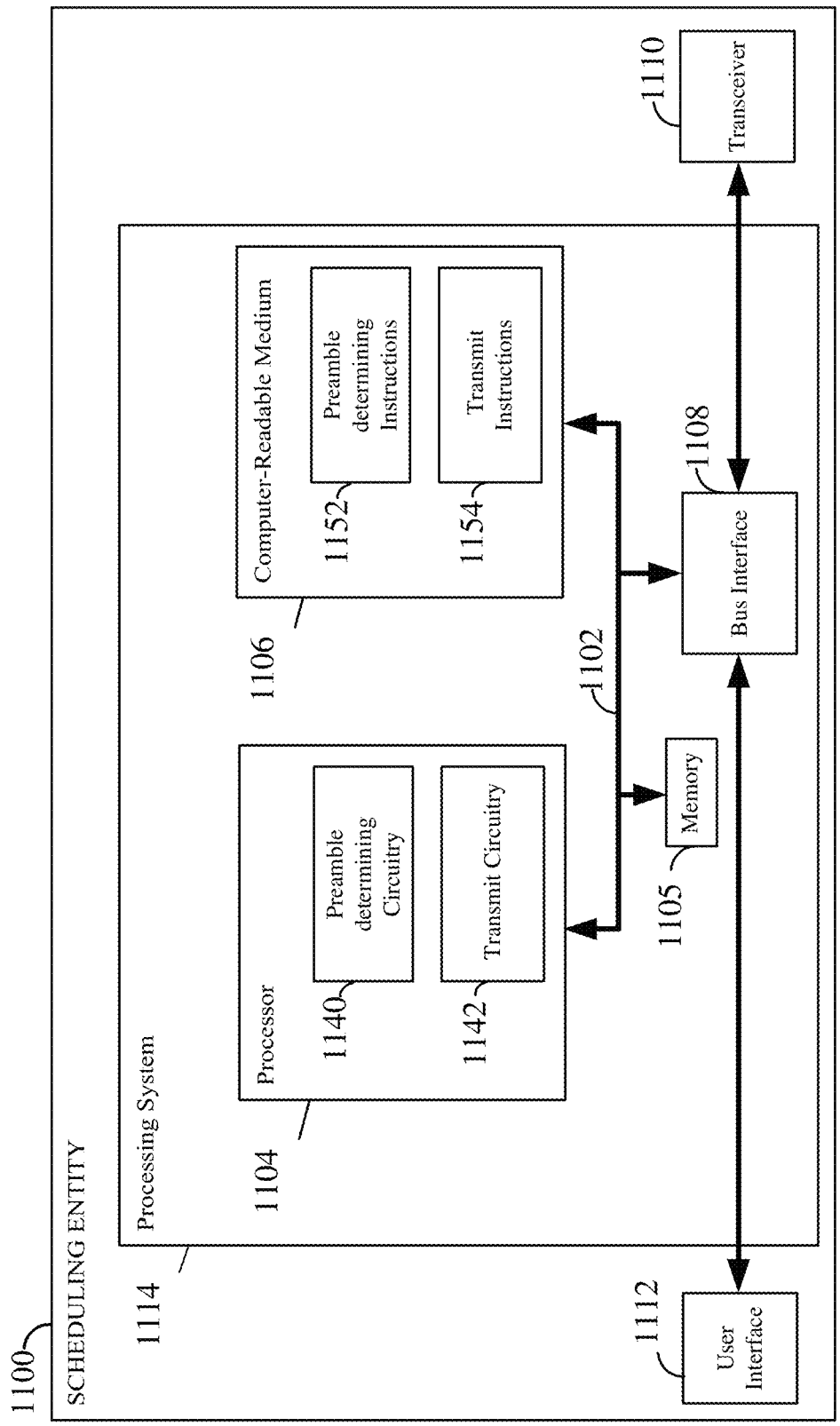
FIG. 11 is a diagram illustrating an example of a hardware implementation for a scheduling entity according to some aspects of the present disclosure.
Figure 12:
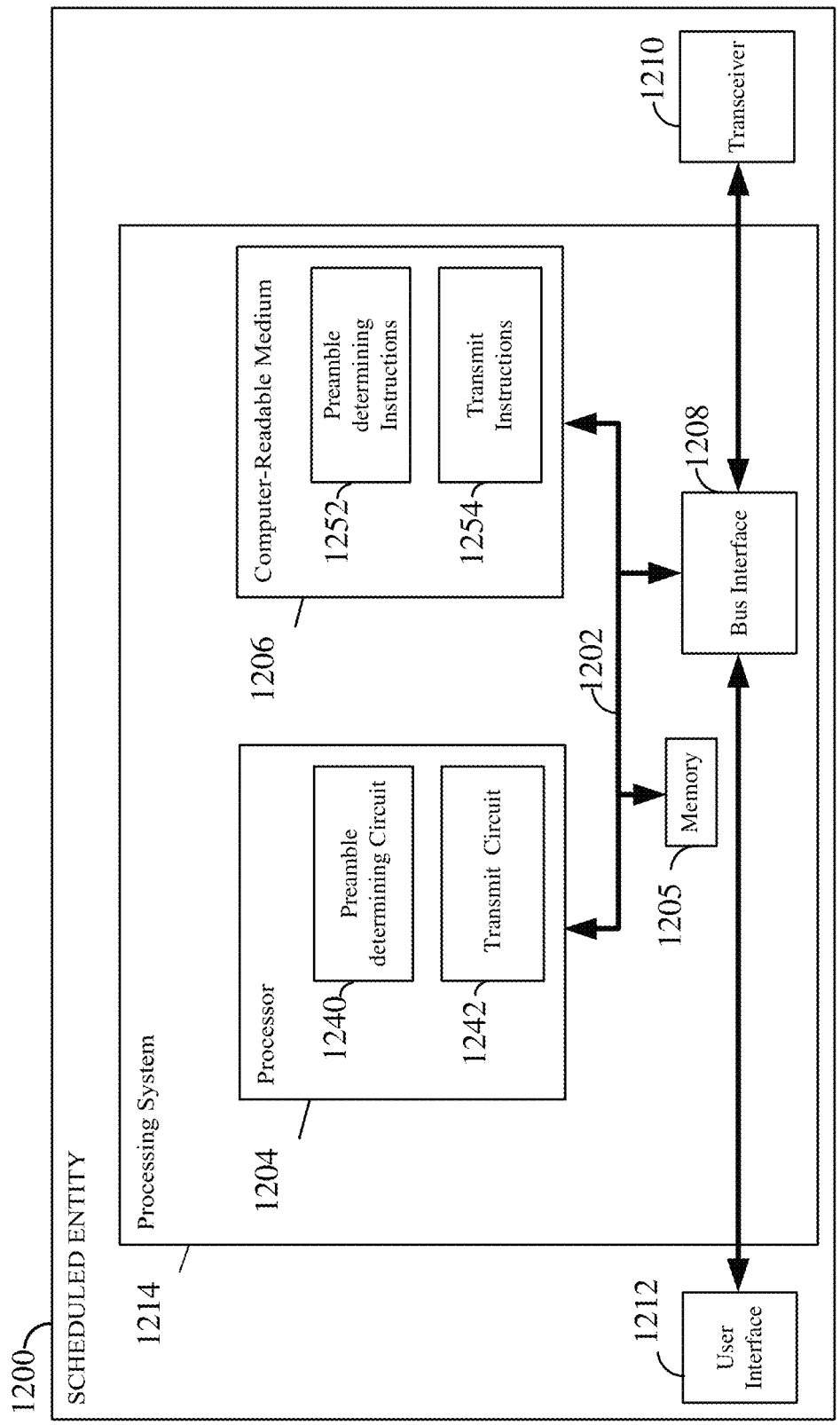
FIG. 12 is a diagram illustrating an example of a hardware implementation for a scheduled entity according to some aspects of the present disclosure.

It is noted here that the presently disclosed methodology described in FIGS. 6-9 may be employed in the communication between the scheduling entity 202 or scheduling entity 1100 shown in FIGS. 2 and 11 herein and the scheduled entity (or entities) 204 or 1200 shown in FIGS. 2 and 12, respectively. Additionally, the above examples may be utilized with LBT frames that include RTS/CTS in unlicensed spectrum, but also the present methods and apparatus are contemplated as being applicable to licensed spectrum systems for wireless communication as well. In some examples, access to unlicensed spectrum with a 5G New Radio (NR) system, for example, may require sharing the unlicensed spectrum with traditional types of unlicensed wireless communication, such as Wi-Fi, Bluetooth, LTE-U (Long Term Evolution (LTE) in unlicensed spectrum), LAA (Licensed-Assisted Access), or MuLTEfire.

Figure 10:
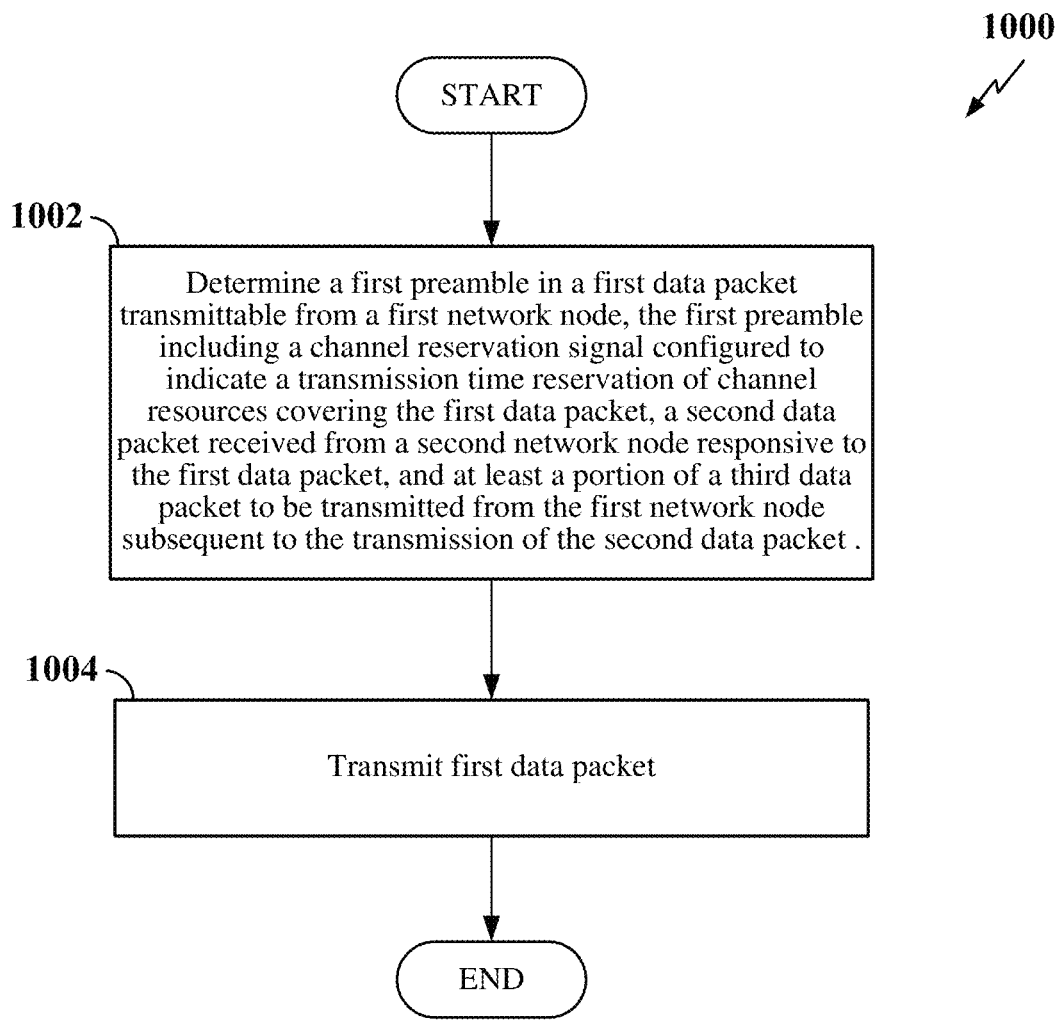
FIG. 10 is a flow chart illustrating a process for transmission of bursts or packets configured with preambles communicating channel reservation according to some embodiments.

FIG. 10 is a flow chart illustrating a process 1000 for wireless communication in accordance with some aspects of the present disclosure. As described below, some or all illustrated features may be omitted in a particular implementation within the scope of the present disclosure, and some illustrated features may not be required for implementation of all embodiments. In the following description, it will be understood a first node may be any device capable of transmitting in the DL, and may include network devices such as a base station, a Node B, an eNB, a scheduling entity, or other similar devices such as a UE operable in a peer to peer manner and serving another node such as another UE for transmitting communication signals to another node, such as even another UE or scheduled node. Similarly, it will be understood that a second node may be any device capable of transmitting to another node, and may include a mobile station, UE, scheduled entity, or other similar devices such as a UE operable in a peer-to-peer manner and transmitting signals to another node such as another UE configured for transmitting DL communications. In some examples, the process 1000 may be carried out by any suitable apparatus or means for carrying out the functions or algorithm described below. It is also noted that while the present examples are described in the context of UL and DL transmissions, the present methods and apparatus are not considered to be constrained to these conventions. For example, the bursts or packets communicated between two peer or scheduled nodes in a frame may utilize the present preamble structures described herein.

At block 1002 method 1000 includes determining or forming a first preamble in a first data packet transmittable from a first network node, the first preamble including a channel reservation signal configured to indicate a transmission time reservation of channel resources covering the first data packet, a second data packet received from a second network node responsive to the first data packet, and at least a portion of a third data packet to be transmitted from the first network node subsequent to the transmission of the second data packet. In the context of LBT frames shown in FIGS. 6-9, the first, second, and third data packets or bursts are within a particular frame. In other aspects, the first data packet may be an RTS burst transmitted on downlink channels from an eNB, but the process 1002 is not limited to such. Further, process 1002 may include the second data packet being a CTS uplink burst and the second network node a UE, although process 1002 is again not limited to such. Finally, the third data packet may be a downlink data packet or burst from an eNB to a UE, although the method 1000 is not limited to such. In other aspects, the first node may be a mobile station or UE acting as an eNB or scheduling entity, and the second node a UE or scheduled entity.

Additionally, as will be appreciated from the examples of FIGS. 6-9, each of the first, second, and third data packets include a preamble having a channel reservation signal. In other aspects, the preambles may act to renew all or a portion of channel resources as illustrated in FIGS. 7 and 9, as examples. Further, in the context of LBT frames or similarly configured frames, the first data packet may be a request to send (RTS) packet as previously illustrated, the second data packet may be a clear to send (CTS) packet, and the third data packet a downlink (DL) data transmission packet.

Additionally, it is noted that in other examples of method 1000, the first data packet is not necessarily the first occurring packet within a frame. For example, the first data packet may be a clear to send (CTS) packet, the second data packet a downlink (DL) data transmission packet, and the third data packet an uplink (UL) data transmission packet.

According to further aspects of method 1000, the preambles may include a channel usage beacon signal (CUBS) and the channel reservation signal may be a Network Allocation Vector (NAV) or similar construct. Additionally, method 1000 may encompass the scenario of FIG. 7, for example, where the first data packet is an RTS packet using all of the plurality of channels, the second data packet is a CTS packet communicating a metric concerning the plurality of channels related to suitability for downlink transmission, and the third data packet is configured as a downlink data transmission packet utilizing a portion of the plurality of channels based on the communicated metric, where the preamble in the third data packet is configured to indicate a reservation renewal of the portion of the plurality of channels. Additionally, the communicated metric may include one or more of the following: a channel quality indicator (CQI) for the plurality of channels, a first indicator from a UE configured to indicate one or more of the plurality is jammed, a second indicator from a UE configured to indicate one or more of the plurality of channels failed a Clear Channel Assessment (CCA), or a third indicator from a UE configured to indicate that the UE will not receive transmissions on one or more of the plurality of channels for various reasons decided in the UE. In an additional aspect, any of these indicators for communicating the metric may be configured as a bitmap fed back to indicate which channels of the plurality of channels are blocked or the UE simply does not want to receive from that channel.

Method 1000 may also include the first data packet being a CTS packet using all of the plurality of channels, the second data packet being a downlink (DL) data packet; and the third data packet being configured as an uplink (UL) data transmission packet utilizing a number of channels less than the plurality of channels based on a channel assessment performed in a UE, wherein the unused channels may be released and those channels used are communicated as being renewed in a preamble of the third packet.]Of further note, each of the packets comprises a plurality of wireless transmission channels each having a particular frequency bandwidth. In addition, it is noted that in an aspect the first, second, and third data packets are within a listen before talk (LBT) frame, but the invention is not limited to such.

Scheduling Entity

FIG. 11 is a block diagram illustrating an example of a hardware implementation for a scheduling entity 1100 employing a processing system 1114. For example, the scheduling entity 1100 may be a user equipment (UE) as illustrated in FIG. 1 or 2. In another example, the scheduling entity 1100 may be a base station as illustrated in FIG. 1 or 2.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described before and illustrated in FIG. 10.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided.

In some aspects of the disclosure, the processor 1104 may include preamble determining or setting circuitry 1140 configured for various functions, including, for example, determining a preamble or CUBS/NAV for reserving a particular time, such as first, second, and a portion of a third data packet. For example, the preamble determining circuitry 1140 may be configured to implement one or more of the functions described above in relation to FIGS. 6-10, including, e.g., block 1002 in FIG. 10. Furthermore, one or more of processing system 1114, processor 1104, and/or preamble determining circuitry 1140, and equivalents thereof, may constitute means for setting, configuring, establishing, or determining a first preamble within a first data packet transmitted from a first network node in the wireless communication system, the first preamble including a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet.

Processor 1104 may further include transmit circuitry 1142 that is configured to cause a transmitter (e.g., transceiver 1110) to transmit data packets with the determined preamble; e.g., assemble the packets to include a preamble including CUBS/NAV field and causing the packets to be transmitted. For example, the transmit circuitry 1142 may be configured to implement one or more of the functions described above in relation to FIGS. 6-10, including, e.g., block 1004 in FIG. 10. Furthermore, transmit circuitry 1142, bus interface 1108, and/or transceiver 1110, or equivalents thereof may constitute means for transmitting at least the first data packet, which includes a preamble and/or CUBS/NAV configured for reserving channel resources including the first data packet, a second data packet, and at least a portion of a third data packet.

Of further note, the processor 1104 and circuitry 1140 may further be configured for determining a preamble for a second or subsequent data packet in a sequence of data packets or bursts to cover reservation of all or a portion of channel resources for a next data packet as well as a at least a portion of yet a third subsequent data packet. Still further, the processor 1104 and circuitry 1140 may further be configured for determining a preamble for a data packet including a renewal request for channel resources.

Processor 1104 is further responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include software or code 1152 configured for various functions, including, for example, setting, configuring, establishing, or determining a first preamble within a first data packet transmitted from a first network node in the wireless communication system, the first preamble including a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet. For example, the software or code 1152 may be configured to implement one or more of the functions described above in relation to FIG. 6-10, including, e.g., block 1002 in FIG. 10.

The medium 1106 may also include software or code 1154 configured for various functions, including, for example, setting, configuring, establishing, or transmitting the first preamble within the first data packet transmitted from a first network node in the wireless communication system, with the first preamble including a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet. For example, the software or code 1154 may be configured to implement one or more of the functions described above in relation to FIG. 6-10, including, e.g., block 1004 in FIG. 10.

Of further note, the software or code 1152 and 1154 may further be configured for determining a preamble for a second or subsequent data packet in a sequence of data packets or bursts to cover reservation of all or a portion of channel resources for a next data packet as well as a at least a portion of yet a third subsequent data packet. Still further, the software or code 1152 and 1154 may further be configured for determining a preamble for a data packet including a renewal request for channel resources.

Scheduled Entity

FIG. 12 is a conceptual diagram illustrating an example of a hardware implementation for an exemplary scheduled entity 1200 employing a processing system 1214. In accordance with various aspects of the disclosure, an element, or any portion of an element, or any combination of elements may be implemented with a processing system 1214 that includes one or more processors 1204. For example, the scheduled entity 1200 may be a user equipment (UE) as illustrated in any one or more of FIG. 1 or 2.

The processing system 1214 may have similar architecture as the processing system 1114 illustrated in FIG. 11, including a bus interface 1208, a bus 1202, memory 1205, a processor 1204, and a computer-readable medium 1206. Furthermore, the scheduled entity 1200 may include a user interface 1212 and a transceiver 1210 substantially similar to those described above in FIG. 12. That is, the processor 1204, as utilized in a scheduled entity 1200, may be used to implement any one or more of the processes described before and illustrated in FIG. 10.

In some aspects of the disclosure, the processor 1204 may include preamble determining circuitry configured for various functions, including, for example, In some aspects of the disclosure, the processor 1104 may include preamble determining or setting circuitry 1140 configured for various functions, including, for example, determining a preamble or CUBS/NAV for reserving a particular time, such as first, second, and a portion of a third data packet. For example, the preamble determining circuitry 1140 may be configured to implement one or more of the functions described above in relation to FIGS. 6-10, including, e.g., block 1002 in FIG. 10. Furthermore, one or more of processing system 1214, processor 1204, and/or preamble determining circuitry 1240, and equivalents thereof, may constitute means for setting, configuring, establishing, or determining a first preamble within a first data packet transmitted from a first network node in the wireless communication system, the first preamble including a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet.

Of further note, the processor 1204 and circuitry 1240 may further be configured for determining a preamble for a second or subsequent data packet in a sequence of data packets or bursts to cover reservation of all or a portion of channel resources for a next data packet as well as a at least a portion of yet a third subsequent data packet. Still further, the processor 1204 and circuitry 1240 may further be configured for determining a preamble including a renewal of channel resources. Still further, the processor 1204 and circuitry 1240 may further be configured for determining a preamble for a data packet including a renewal request for channel resources.

One or more processors 1204 in the processing system 1214 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may include software or code 1252 configured for various functions, including, for example, setting, configuring, establishing, or determining a first preamble within a first data packet transmitted from a first network node in the wireless communication system, the first preamble including a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet. For example, the software or code 1252 may be configured to implement one or more of the functions described above in relation to FIG. 6-10, including, e.g., block 1002 in FIG. 10.

The medium 1206 may also include software or code 1254 configured for various functions, including, for example, setting, configuring, establishing, or transmitting the first preamble within the first data packet transmitted from a first network node in the wireless communication system, with the first preamble including a channel reservation indication configured to indicate a transmission time reservation of channel resources covering the first data packet, a second data packet received from a second network node responsive to the first data packet, and at least a portion of a third data packet transmitted from the first network node subsequent to the transmission of the second data packet. For example, the software or code 1154 may be configured to implement one or more of the functions described above in relation to FIG. 6-10, including, e.g., block 1004 in FIG. 10.

Of further note, the software or code 1252 and 1254 may further be configured for determining a preamble for a second or subsequent data packet in a sequence of data packets or bursts to cover reservation of all or a portion of channel resources for a next data packet as well as a at least a portion of yet a third subsequent data packet. Still further, the software or code 1252 and 1254 may further be configured for determining a preamble for a data packet including a renewal request for channel resources.

One or more of the components, steps, features and/or functions illustrated in FIGS. 1, 2, and 6-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 6-12 may be configured to perform one or more of the methods, features, or steps described herein. The novel algorithms described herein may also be efficiently implemented in software and/or embedded in hardware.

Several aspects of a wireless communication network have been presented with reference to exemplary implementations. As those skilled in the art will readily appreciate, various aspects described throughout this disclosure may be extended to other telecommunication systems, network architectures and communication standards. By way of example, various aspects may be implemented within systems defined by 3GPP, such as Long-Term Evolution (LTE), the Evolved Packet System (EPS), the Universal Mobile Telecommunication System (UMTS), the Global System for Mobile (GSM), and/or New Radio (NR). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication in a wireless communication system comprising:
   determining a first preamble within a first data packet transmitted from a first network node in the wireless communication system, the first preamble including a channel reservation signal configured to indicate a transmission time reservation of channel resources covering all or a portion of each of a plurality of data packets consisting of:
      less than an entirety of the first data packet,
      an entirety of a second data packet received from a second network node responsive to the first data packet, and
      less than an entirety of a third data packet to be transmitted from the first network node subsequent to a transmission of the second data packet; and
   transmitting the first data packet,
   wherein the second data packet includes a second preamble having a second channel reservation signal configured to indicate a second transmission time reservation of channel resources covering less than the entirety of the second data packet and the entirety of the third data packet, and the third data packet includes a third preamble having a third channel reservation signal configured to indicate a third transmission time reservation of channel resources covering less than the entirety of the third data packet.

2. The method of claim 1, wherein the first data packet is a downlink transmission and the first network node is one or more of a base station, a Node B, an eNB, or a gNB.

3. The method of claim 1, wherein the second data packet is an uplink transmission from a user equipment (UE) to the first network node.

4. The method of claim 1, wherein the first data packet is a request to send (RTS) packet, the second data packet is a clear to send (CTS) packet, and the third data packet is a downlink data transmission packet.

5. The method of claim 1, wherein the first data packet is a clear to send (CTS) packet, the second data packet is a downlink data transmission packet, and the third data packet is an uplink data transmission packet.

6. The method of claim 1, wherein at least the first preamble comprises a channel usage beacon signal (CUBS) and the channel reservation signal comprises a Network Allocation Vector (NAV).

7. The method of claim 1, wherein each of the first data packet, the second data packet, and the third data packet is transmitted in a plurality of wireless transmission channels, wherein each of the plurality of wireless transmission channels has a particular frequency bandwidth.

8. The method of claim 7, wherein the first data packet is a packet using all of the plurality of wireless transmission channels, the second data packet is a data packet communicating a metric concerning the plurality of wireless transmission channels related to suitability for downlink transmission; and the third data packet is configured as a downlink data transmission packet utilizing a portion of the plurality of wireless transmission channels based on the metric.

9. The method of claim 8, wherein a preamble in the third data packet is configured to indicate a reservation renewal of the portion of the plurality of wireless transmission channels.

10. The method of claim 8, wherein the metric includes one or more of a channel quality indicator (CQI) for one or more of the plurality of wireless transmission channels, a first indicator from a first UE configured to indicate one or more of the plurality of wireless transmission channels is jammed, a second indicator from a second UE configured to indicate one or more of the plurality of wireless transmission channels failed a Clear Channel Assessment (CCA), or a third indicator from a third UE configured to indicate that the third UE will not receive transmissions on one or more of the plurality of wireless transmission channels.

11. The method of claim 7, wherein the first data packet is a packet using all of the plurality of wireless transmission channels, the second data packet is a downlink data packet; and the third data packet is configured as an uplink data transmission packet utilizing a number of wireless transmission channels less than the plurality of wireless transmission channels based on a channel assessment performed in a UE, wherein the wireless transmission channels not used by the UE may be released and the wireless transmission channels used by the UE are communicated as being renewed in a preamble of the third data packet.

12. The method of claim 1, wherein the first data packet, the second data packet, and the third data packet are within a listen before talk (LBT) frame.

13. An apparatus for wireless communication, the apparatus comprising:
at least one processor;
at least one transceiver communicatively coupled to the at least one processor; and
a memory communicatively coupled to the at least one processor, wherein the at least one processor is configured to:
transmit a first data packet from a first network node including a first preamble, the first preamble including a channel reservation signal configured to indicate a transmission time reservation of channel resources covering all or a portion of each of a plurality data packets consisting of:
less than an entirety of the first data packet,
an entirety of a second data packet received from a second network node responsive to the first data packet, and
less than an entirety of a third data packet to be transmitted from the first network node subsequent to a transmission of the second data packet,
wherein the second data packet includes a second preamble having a second channel reservation signal configured to indicate a second transmission time reservation of channel resources covering less than the entirety of the second data packet and the entirety of the third data packet, and the third data packet includes a third preamble having a third channel reservation signal configured to indicate a third transmission time reservation of channel resources covering less than the entirety of the third data packet.

14. The apparatus of claim 13, wherein the first data packet is a downlink transmission and the first network node is one or more of a base station, a Node B, an eNB, or a gNB.

15. The apparatus of claim 13, wherein the second data packet is an uplink transmission from a user equipment (UE) to the first network node.

16. The apparatus of claim 13, wherein the first data packet is a request to send (RTS) packet, the second data packet is a clear to send (CTS) packet, and the third data packet is a downlink data transmission packet.

17. The apparatus of claim 13, wherein the first data packet is a clear to send (CTS) packet, the second data packet is a downlink data transmission packet, and the third data packet is an uplink data transmission packet.

18. The apparatus of claim 13, wherein at least the first preamble comprises a channel usage beacon signal (CUBS) and the channel reservation signal comprises a Network Allocation Vector (NAV).

19. The apparatus of claim 13, wherein each of the first data packet, the second data packet, and the third data packet is transmitted in a plurality of wireless transmission channels, wherein each of the plurality of wireless transmission channels has_a particular frequency bandwidth.

20. The apparatus of claim 19, wherein the first data packet is a packet using all of the plurality of wireless transmission channels, the second data packet is a data packet communicating a metric concerning the plurality of wireless transmission channels related to suitability for downlink transmission; and the third data packet is configured as a downlink data transmission packet utilizing a portion of the plurality of wireless transmission channels based on the metric.

21. The apparatus of claim 20, wherein a preamble in the third data packet is configured to indicate a reservation renewal of the portion of the plurality of wireless transmission channels.

22. The apparatus of claim 21, wherein the metric includes one or more of a channel quality indicator (CQI) for one or more of the plurality of wireless transmission channels, a first indicator from a first UE configured to indicate one or more of the plurality of wireless transmission channels is jammed, a second indicator from a second UE configured to indicate one or more of the plurality of wireless transmission channels failed a Clear Channel Assessment (CCA), or a third indicator from a third UE configured to indicate that the third UE will not receive transmissions on one or more of the plurality of wireless transmission channels.

23. The apparatus of claim 20, wherein the first data packet is a packet using all of the plurality of wireless transmission channels, the second data packet is a downlink data packet; and the third data packet is configured as an uplink data transmission packet utilizing a number of wireless transmission channels less than the plurality of wireless transmission channels based on a channel assessment performed in a UE, wherein the wireless transmission channels not used by the UE may be released and the wireless transmission channels used by the UE are communicated as being renewed in a preamble of the third data packet.

24. The apparatus of claim 13, wherein the first data packet, the second data packet, and the third data packet are within a listen before talk (LBT) frame.

25. An apparatus for wireless communication, the apparatus comprising:
means for determining a first preamble in a first data packet transmitted from a first network node, the first preamble including a channel reservation signal configured to indicate a transmission time reservation of channel resources covering all or a portion of each of a plurality of data packets consisting of:
less than an entirety of the first data packet,
an entirety of a second data packet received from a second network node responsive to the first data packet, and
less than an entirety of a third data packet to be transmitted from the first network node subsequent to a transmission of the second data packet; and
means for transmitting the first data packet,
wherein the second data packet includes a second preamble having a second channel reservation signal configured to indicate a second transmission time reservation of channel resources covering less than the entirety of the second data packet and the entirety of the third data packet, and the third data packet includes a third preamble having a third channel reservation signal configured to indicate a third transmission time reservation of channel resources covering less than the entirety of the third data packet.

26. The apparatus of claim 25, wherein at least the first preamble comprises a channel usage beacon signal (CUBS) and the channel reservation signal comprises a Network Allocation Vector (NAV).

27. The apparatus of claim 25, wherein the second data packet includes a second preamble having a second channel reservation signal configured to indicate a second transmission time reservation of channel resources covering less than an entirety of the second data packet and the entirety of the third data packet.

28. A non-transitory computer-readable medium storing computer-executable code, comprising code for causing a computer to:
determine a first preamble within a first data packet transmitted from a first network node in a wireless communication system, the first preamble including a channel reservation signal configured to indicate a transmission time reservation of channel resources covering all or a portion of each of a plurality of data packets consisting of:
less than an entirety of the first data packet,
an entirety of a second data packet received from a second network node responsive to the first data packet, and
less than an entirety of a third data packet to be transmitted from the first network node subsequent to a transmission of the second data packet; and
transmit the first data packet,
wherein the second data packet includes a second preamble having a second channel reservation signal configured to indicate a second transmission time reservation of channel resources covering less than the entirety of the second data packet and the entirety of the third data packet, and the third data packet includes a third preamble having a third channel reservation signal configured to indicate a third transmission time reservation of channel resources covering less than the entirety of the third data packet.

29. The non-transitory computer-readable medium of claim 28, wherein at least the first preamble comprises a channel usage beacon signal (CUBS) and the channel reservation signal comprises a Network Allocation Vector (NAV).

30. The non-transitory computer-readable medium of claim 28, wherein the second data packet includes a second preamble having a second channel reservation signal configured to indicate a second transmission time reservation of channel resources covering less than an entirety of the second data packet and the entirety of the third data packet.

* * * * *